(12) United States Patent
Kirbas (10) Patent No.: US 7,346,342 B2
(45) Date of Patent: Mar. 18, 2008

(54) AUTOMATIC DATA SEND TO CALL DESTINATION

(75) Inventor: Bilhan Kirbas, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 33 days.

(21) Appl. No.: 11/049,191

(22) Filed: Feb. 2, 2005

(65) Prior Publication Data

US 2006/0172729 A1 Aug. 3, 2006

(51) Int. Cl.
*H04Q 7/20* (2006.01)

(52) U.S. Cl. ............... 455/415; 455/553.1; 455/414.1; 455/418; 370/466; 370/352; 370/338

(58) Field of Classification Search ............... 455/418, 455/414, 466, 422, 3.06, 414.1, 415, 553.1; 370/232, 229, 352, 455, 466, 338; 379/88.13, 379/142.06
See application file for complete search history.

(56) References Cited

U.S. PATENT DOCUMENTS

| | | | | |
|---|---|---|---|---|
| 6,442,251 | B1* | 8/2002 | Maes et al. ............... | 379/93.23 |
| 7,096,009 | B2* | 8/2006 | Mousseau et al. ......... | 455/415 |
| 2002/0141442 | A1* | 10/2002 | Plain et al. ............... | 370/466 |
| 2003/0058343 | A1 | 3/2003 | Katayama | |
| 2003/0077064 | A1 | 4/2003 | Katayama | |
| 2003/0083050 | A1 | 5/2003 | Kraft et al. | |
| 2003/0110480 | A1* | 6/2003 | Rajaram ................ | 717/140 |
| 2004/0001226 | A1* | 1/2004 | Ohtuka ................ | 358/1.15 |
| 2004/0042442 | A1* | 3/2004 | Pecen et al. ............ | 370/352 |
| 2004/0063400 | A1* | 4/2004 | Kim et al. ............ | 455/3.06 |
| 2004/0240434 | A1* | 12/2004 | Sato et al. ............ | 370/352 |
| 2004/0264375 | A1* | 12/2004 | Kim ..................... | 370/232 |
| 2005/0118990 | A1* | 6/2005 | Stephens ............... | 455/418 |
| 2005/0246742 | A1* | 11/2005 | Benco et al. ........... | 725/62 |

FOREIGN PATENT DOCUMENTS

| | | |
|---|---|---|
| EP | 1 441 555 A1 | 7/2004 |
| JP | 2001-134507 | 3/2001 |
| WO | WO 03/005717 A1 * | 5/2001 |

\* cited by examiner

*Primary Examiner*—William Trost
*Assistant Examiner*—Julio Perez (57) ABSTRACT

Systems and methods are provided that enable a wireless communication device to send a predetermined data object to a destination address for the companion wireless communication device in an active voice call. When an active voice call is in session, a data object is identified such as an image captured by an integrated digital camera. A destination address module obtains the destination address of for the companion wireless communication device and the data object is then sent to the destination address over a data communication channel that is established simultaneously with the active voice call.

17 Claims, 4 Drawing Sheets

AUTOMATIC DATA SEND TO CALL DESTINATION

BACKGROUND

1. Field of the Invention

The present invention generally relates to wireless communications and more specifically relates to automatically sending a data communication to a destination address for a current caller.

2. Related Art

The design and function of wireless communication devices have been improving drastically over the last decade. More recently, efforts have been underway to provide wireless communication devices with multiple radio interfaces to integrate the various standard carrier protocols such as CDMA and GSM into a single handset. Additionally, designers and manufacturers are including data communication specific communication capabilities into wireless communication devices to enable conventional data communications such as email, web browsing, and the like on a wireless communication device platform. Furthermore, wireless communication devices are now being designed that are capable of simultaneous voice and data communications. Therefore, what is needed are systems and methods that take advantage of these new capabilities of wireless communication devices.

SUMMARY

Systems and methods are provided that enable a first wireless communication device to send a predetermined data object to a destination address for a second wireless communication device in an active voice call. When an active voice call is in session, a data object is identified such as an image captured by a digital camera integrated with the first wireless communication device. A destination address module on the first wireless communication device obtains the destination address of the second wireless communication device and the data object is then sent to the destination address over a data communication channel that is established simultaneously with the active voice call.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for automatically determining a destination address for a wireless communication device in an active voice call and sending a data object to the destination address for the wireless communication device via a data call that is simultaneous with the voice call. For example, one method as disclosed herein allows for a wireless communication device to receive a call and establish an active all over a wireless communication network. The wireless communication device then captures a digital picture through an integrated digital camera. The wireless communication device next uses caller identification to obtain a destination address for the calling wireless communication device and sends the digital picture to the calling wireless communication device at the destination address.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

In the present description, a wireless communication device may be alternatively referred to as a wireless device, a handset, a mobile handset, and a mobile unit. Furthermore, the present description describes the invention with respect to a digital picture as the data object that is captured by a handset during a voice call and then sent via a simultaneous data call. It will be understood by those having skill in the art that other data objects may also be captured or identified and sent, including audio recordings, moving video recordings, audio/moving video recordings, audio in combination with still video, and electronic contact and calendar information such as v-cards and v-calendar events, just to name a few.

Figure 1:
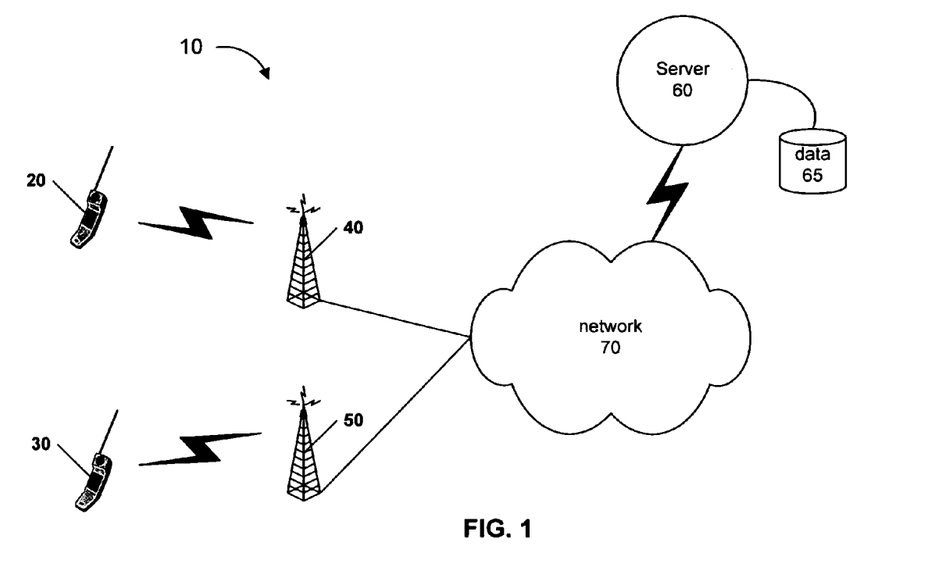
FIG. 1 is a high level network diagram illustrating an example wireless communication system for voice and data communications according to an embodiment of the present invention.

FIG. 1 is a high level network diagram illustrating an example wireless communication system 10 for voice and data communications according to an embodiment of the present invention. In the illustrated embodiment, the system 10 comprises handsets 20 and 30 that are communicatively coupled to a network 70 via base stations 40 and 50, respectively. A server computer is also communicatively coupled with network 70 and is configured with a data storage area 65.

Wireless communication devices 20 and 30 may be any of a variety of wireless communication devices that are capable of simultaneous voice and data communications. This capability may be provided in a number of ways including deployment of multiple radios in the handset, use of a software defined radio to alternate operation on different frequencies, and interleaving voice and data packets among others, as will be understood by those having skill in the art. There may be a plurality of handsets at any given time in the system 10.

The server 60 may be any of a variety of data or service providers that are accessible via the network 70. For example, server 60 may provide wireless web content or a GPS to physical address translation service. The server 60 may also be an email server that routes email communications from a handset to a network email address and from a network email address to a handset. There may be a plurality of servers 60 at any give time in the system 10.

The network 70 preferably includes a wireless communication network and may also include other types of networks such as the ubiquitous Internet. A handset 20 may establish voice communications with a handset 30 via network 70 and in such a case the network 70 may comprise only a wireless communication network operated by a carrier. Alternatively, a handset 20 or other computing device such as a personal computer (not shown) may send an email to a handset 30 via network 70 and in such a case the network 70 may comprise a private corporate network and a wireless communication network operated by a carrier.

Figure 2:
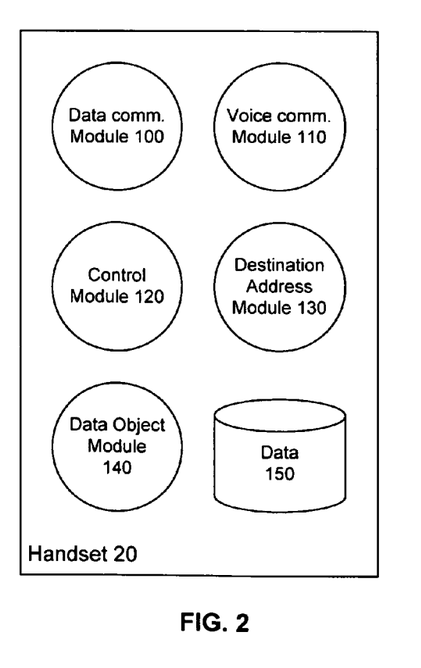
FIG. 2 is a functional block diagram illustrating an example wireless communication device according to an embodiment of the present invention.

FIG. 2 is a functional block diagram illustrating an example wireless communication device according to an embodiment of the present invention. In the illustrated embodiment, the handset 20 comprises a data communication module 100, a voice communication module 110, a control module 120, a destination address module 130, a data object module 140, and a data storage area 150.

The data communication module 100 is configured to establish a data communication call for the handset 20. According to one embodiment, the data communication module 100 can establish data communications simultaneously with an active voice communication call.

The voice communication module 110 is configured to establish a voice communication call for the handset 20. According to one embodiment, the voice communication module 110 can establish voice communications simultaneously with an active data communication call.

The destination address module 130 is configured to obtain address information related to another handset involved in an active call. For example, the destination address module 130 may obtain a phone number for a handset currently involved in an active voice call, or the destination address module may look up a local or remote phonebook entry for a handset currently involved in an active voice call and obtain an email address or alternative network address information for such a handset.

The data object module 140 is configured to obtain a data object and provide the data object to the control module 140 or directly to the data communication module 100 for delivery to a destination address. In one embodiment, the data object module may control a digital camera, a media card reader, a media card player, or a scanner device, just to name a few. Any sort of integrated or external device may be operable by the data object module 140 or function as the data object module 140.

The data storage area 150 is configured to provide storage of operational information, software, and other data that is useful for operation of the handset 20 and for automatically sending data to a call destination.

The control module 120 is configured to manage data and voice communication calls and is also capable of managing simultaneous data and voice communication calls. The control module 120 is also configured to process data objects obtained or retrieved by the data object module 140 and instruct the destination address module 130 to obtain address information associated with other handsets, for example, phone numbers or email addresses.

Figure 3:
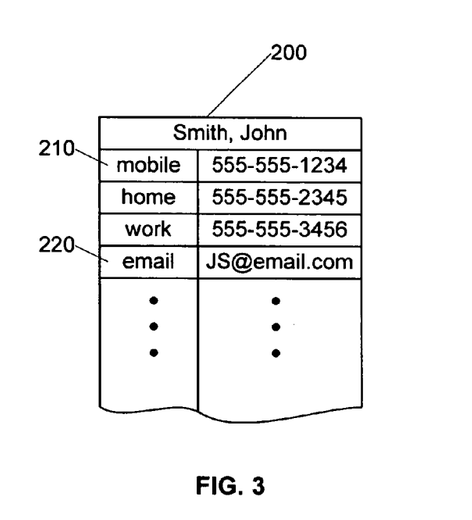
FIG. 3 is a functional block diagram illustrating an example phone book entry stored on a wireless communication device according to an embodiment of the present invention.

FIG. 3 is a functional block diagram illustrating an example phone book entry 200 stored on a wireless communication device according to an embodiment of the present invention. In the illustrated embodiment, the phone book entry is for a person by the name of John Smith and comprises a mobile telephone number and an email address.

Figure 4:
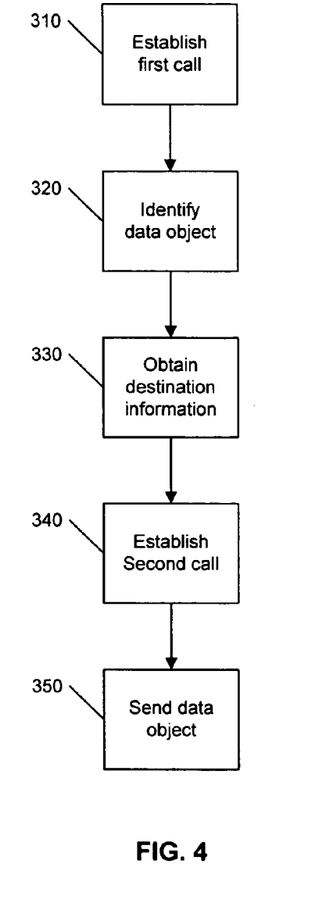
FIG. 4 is a flow diagram illustrating an example process for sending a data object to a recipient during an active voice call according to an embodiment of the present invention.

FIG. 4 is a flow diagram illustrating an example process for sending a data object to a recipient according to an embodiment of the present invention. Initially, in step 310 a first call is established. The first call may be initiated by the handset or received by the handset. The first call may be a voice call or a data call. For example, the first call may be an instant message or chat data call requesting direct text communication between two handsets or between the handset and a network device such as a personal computer. The first call may also be a received or dialed voice call such as a standard voice call, a voice over internet protocol call, a push-to-talk call, or the like. In one embodiment the first call can be established by a voice communication module or a data communication module such as the ones previously described with respect to FIG. 2.

Once the first call is in progress, in step 320 a data object is identified. The data object may be a still digital image, an analog or digital audio recording, a moving video segment, unstructured or formatted data, or any combination of these or other types of data. For example a data object may be a digital picture, an audio/video segment such as an MPEG clip, or a phonebook or calendar entry. In one embodiment, the data object may be identified or obtained by a data object module such as the one previously described with respect to FIG. 2.

After a data object is identified, destination information associated with the first call is obtained, as illustrated in step 330. In one embodiment, the destination information may be obtained by a destination address module such as the one previously described with respect to FIG. 2. Destination information may comprise a telephone number for a mobile handset, an instant message handle, an email address, or other network address information useful to identify a particular network device or individual recipient associated with the first call. The destination information may be obtained from a phonebook entry or from a packet in the first call communication stream. For example, a voice call packet may advantageously contain an identification number for the mobile unit from which the packet was sent. The identification number may be the phone number for the mobile unit or may otherwise provide destination address information for the mobile unit, either directly or indirectly, for example by way of an address lookup. A data call packet may include an internet protocol ("IP") address for the mobile unit or network device from which the packet was sent, thereby providing destination address information for a companion device in the first call.

Once the data object has been identified and the destination address information obtained, in step 340 the handset establishes a second call with the wireless communication network. In one embodiment, a data call may be established by a data communication module such as the one previously described with respect to FIG. 2. Alternatively, a voice call may be established by a voice communication module such as the one previously described with respect to FIG. 2. In the case of a voice call, the voice call is preferably established on a channel with a large amount of bandwidth and capable of sending a relatively large data communication.

The second call may be initiated by the handset or alternatively the second call may already be in progress. For example, the second call may be a data call that was already in progress when the first call (a voice or data call) was received. Because the handset has the capability for simultaneous voice and data calls (and preferably also multiple simultaneous data calls), the second call (i.e., the in progress data call) may have been maintained after the first call was received. Thus, in step 340, the second call may just be confirmed, authenticated, or otherwise validated.

Once the second call has been established, in step 350 the handset sends the data object to the destination address. As previously mentioned, the second call is preferably a data call but may also be a voice call with a dedicated channel for data communications. The destination address may be a phone number, an email address, an instant message address or other network identifiable location information.

Figure 5:
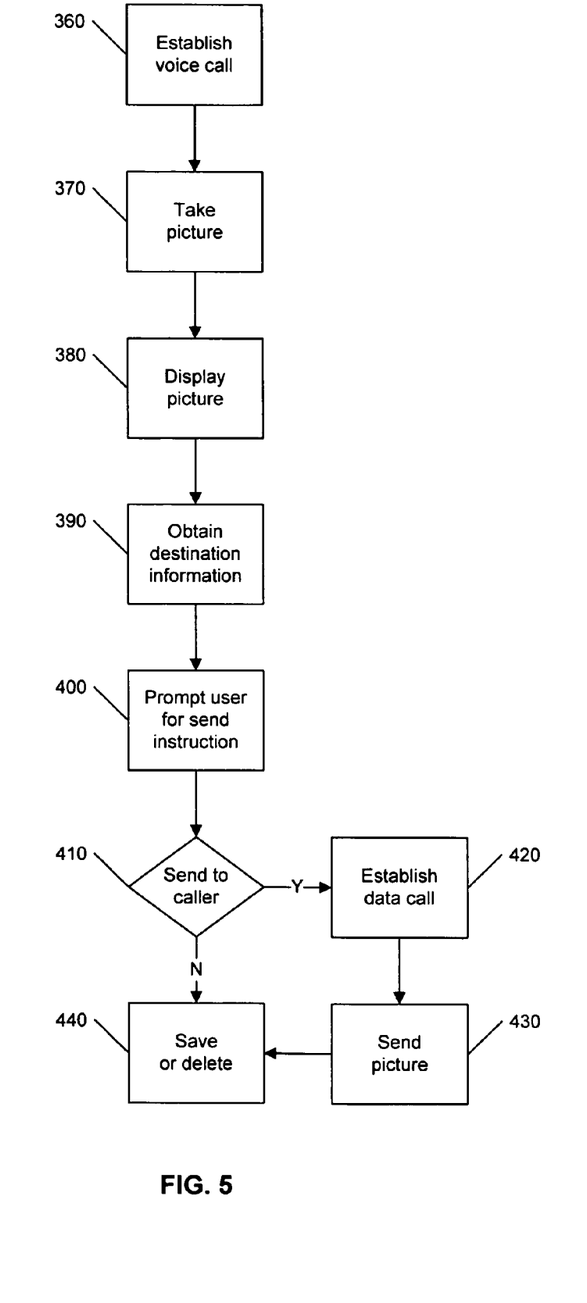
FIG. 5 is a flow diagram illustrating an example process for sending a digital image to a recipient during an active voice call according to an embodiment of the present invention.

FIG. 5 is a flow diagram illustrating an example process for sending a digital image to a recipient during an active voice call according to an embodiment of the present invention. Initially, in step 360 the handset establishes a voice call with a remote party. In one embodiment, the voice call may be established by a voice communication module such as the one previously described with respect to FIG. 2. The voice call may be initiated by the handset or received by the handset.

Once the voice call is established, the handset captures a digital image with an integral or connected digital imaging device such as a camera, as shown in step 370. In one embodiment, the capture of the picture may be controlled by a data object module such as the one previously described with respect to FIG. 2. The picture may next be optionally displayed to the user of the handset, as illustrated in step 380. This step advantageously may allow the user of the handset to determine whether to send the picture or discard it and take another picture.

In step 390, the handset obtains destination information. In one embodiment, obtaining destination information may be carried out by a destination address module such as the one previously described with respect to FIG. 2. The destination information may be obtained from the local phonebook if an entry for the remote party is present. In one embodiment, the destination information may be either a phone number or an email address. Alternative destination addresses capable of receiving a data object such as a digital image may also be used. If no entry in the phonebook is available, the destination information may be obtained from a packet in the communication stream for the active voice call. This information may provide a phone number. In one embodiment, the phone number may be used to look up alternative destination information for the remote party.

Next, in step 400 the handset may optionally prompt the user for an instruction to send the picture. Alternatively, the handset may automatically send the picture to the remote party using the destination information as the address for the remote party. If the user elects to send the picture, as determined in step 410 (or if the handset is configured to send the picture automatically), the handset then establishes a data call in step 420 and sends the picture to the remote party in step 430. The data call is active simultaneously with the voice call. In one embodiment, the data call may be established by a data communication module such as the one previously described with respect to FIG. 2 and the simultaneous voice and data calls may be managed by a control module such as the one previously described with respect to FIG. 2.

After the picture has been sent (or if the user elects not to send the picture) the handset may optionally proceed to a save or delete routine in step 440 that allows the user to decide whether the picture should be saved or discarded. Alternatively, the handset may be configured to automatically save or automatically delete the picture.

Figure 6:
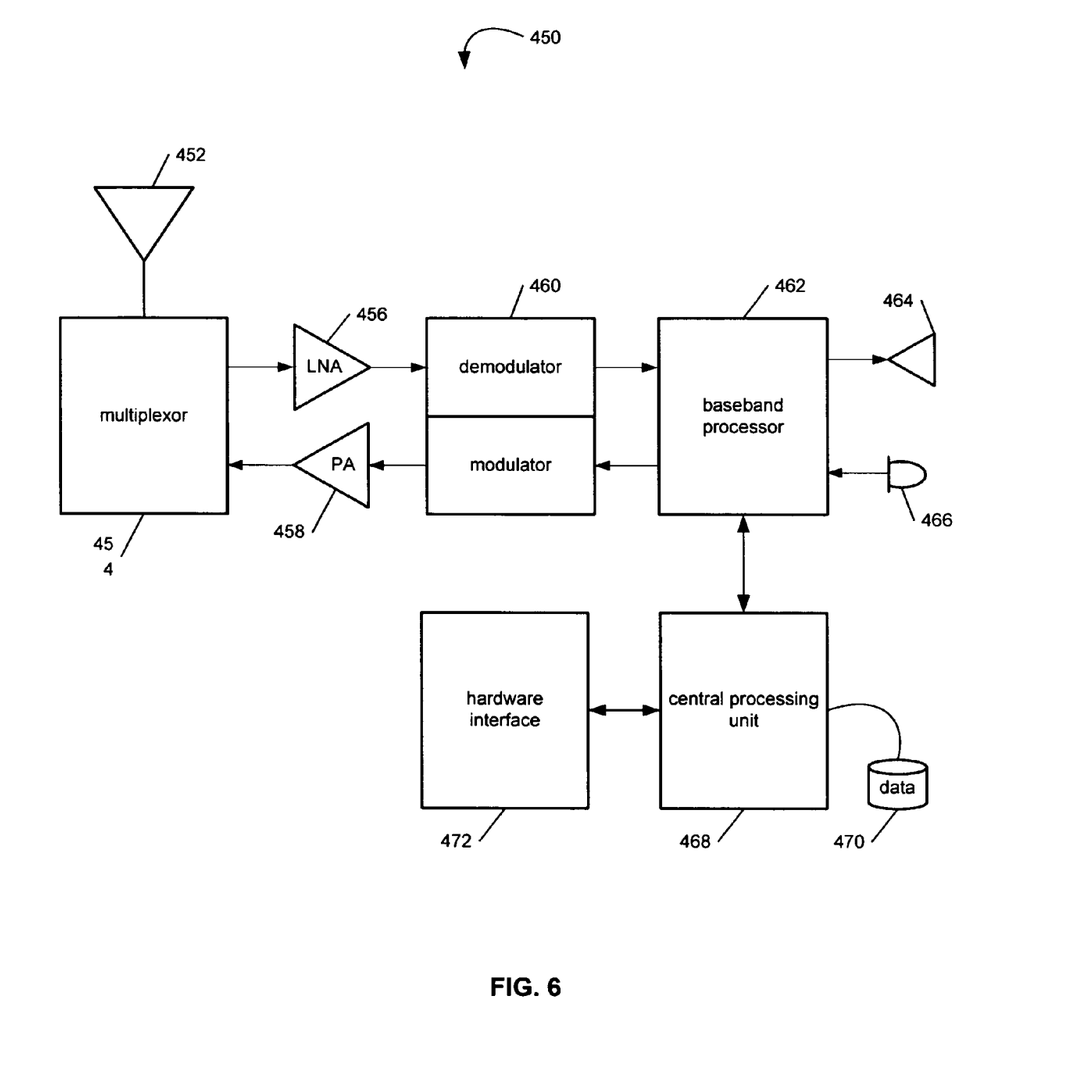
FIG. 6 is a block diagram illustrating an exemplary wireless communication device that may be used in connection with the various embodiments described herein.

FIG. 6 is a block diagram illustrating an exemplary wireless communication device 450 that may be used in connection with the various embodiments described herein. For example, the wireless communication device 450 may be used in conjunction with the handsets 20 and 30 as previously described with respect to FIGS. 1 and 2. However, other wireless communication devices and/or architectures may also be used, as will be clear to those skilled in the art.

The wireless communication device 450 is preferably capable of simultaneous voice and data communications and as such may employ one or more single channel transceivers or one or more dual channel transceivers. The wireless communication device 450 may employ a software defined radio or more than one radio to provide simultaneous voice and data communications. The wireless communication device 450 may also interleave voice and data packets to provide simultaneous voice and data communications.

In the illustrated embodiment, wireless communication device 450 comprises an antenna 452, a multiplexor 454, a low noise amplifier ("LNA") 456, a power amplifier ("PA") 458, a modulation circuit 460, a baseband processor 462, a speaker 464, a microphone 466, a central processing unit ("CPU") 468, a data storage area 470, and a hardware interface 472. In the wireless communication device 450, radio frequency ("RF") signals are transmitted and received by antenna 452. Multiplexor 454 acts as a switch, coupling antenna 452 between the transmit and receive signal paths. In the receive path, received RF signals are coupled from a multiplexor 454 to LNA 456. LNA 456 amplifies the received RF signal and couples the amplified signal to a demodulation portion of the modulation circuit 460.

Typically modulation circuit 460 will combine a demodulator and modulator in one integrated circuit ("IC"). The demodulator and modulator can also be separate components. The demodulator strips away the RF carrier signal leaving a base-band receive audio signal, which is sent from the demodulator output to the base-band processor 462.

If the base-band receive audio signal contains audio information, then base-band processor 462 decodes the signal and converts it to an analog signal. Then the signal is amplified and sent to the speaker 464. The base-band processor 462 also receives analog audio signals from the microphone 466. These analog audio signals are converted to digital signals and encoded by the base-band processor 462. The base-band processor 462 also codes the digital signals for transmission and generates a base-band transmit audio signal that is routed to the modulator portion of modulation circuit 460. The modulator mixes the base-band transmit audio signal with an RF carrier signal generating an RF transmit signal that is routed to the power amplifier 458. The power amplifier 458 amplifies the RF transmit signal and routes it to the multiplexor 454 where the signal is switched to the antenna port for transmission by antenna 452.

The baseband processor 462 is also communicatively coupled with the central processing unit 468. The central processing unit 468 has access to a data storage area 470. The central processing unit 468 is preferably configured to execute instructions (i.e., computer programs or software) that can be stored in the data storage area 470. Computer programs can also be received from the baseband processor 462 and stored in the data storage area 470 or executed upon receipt. Such computer programs, when executed, enable the wireless communication device 450 to perform the various functions of the present invention as previously described.

In this description, the term "computer readable medium" is used to refer to any media used to provide executable instructions (e.g., software and computer programs) to the wireless communication device 450 for execution by the central processing unit 468. Examples of these media include the data storage area 470, microphone 466 (via the baseband processor 462), antenna 452 (also via the baseband processor 462), and hardware interface 472. These computer readable mediums are means for providing executable code, programming instructions, and software to the wireless communication device 450. The executable code, programming instructions, and software, when executed by the central processing unit 468, preferably cause the central processing unit 468 to perform the inventive features and functions previously described herein.

The central processing unit is also preferably configured to receive notifications from the hardware interface 472 when new devices are detected by the hardware interface. Hardware interface 472 can be a combination electromechanical detector with controlling software that communicates with the CPU 468 and interacts with new devices. Alternatively, there may be one or more hardware interfaces 472 coupled with devices such as an integrated digital camera, media card reader, media card player, scanner device, or the like. A hardware interface 472 may interface with an integral device or an external device, for example, via a universal serial bus ("USB"), firewire, or other connection. In one embodiment, the data object module previously described with respect to FIG. 2 may work in conjunction with or control a hardware interface 472 in order to obtain a data object from a device in data communication with the handset 450 via a hardware interface 472.

Figure 7:
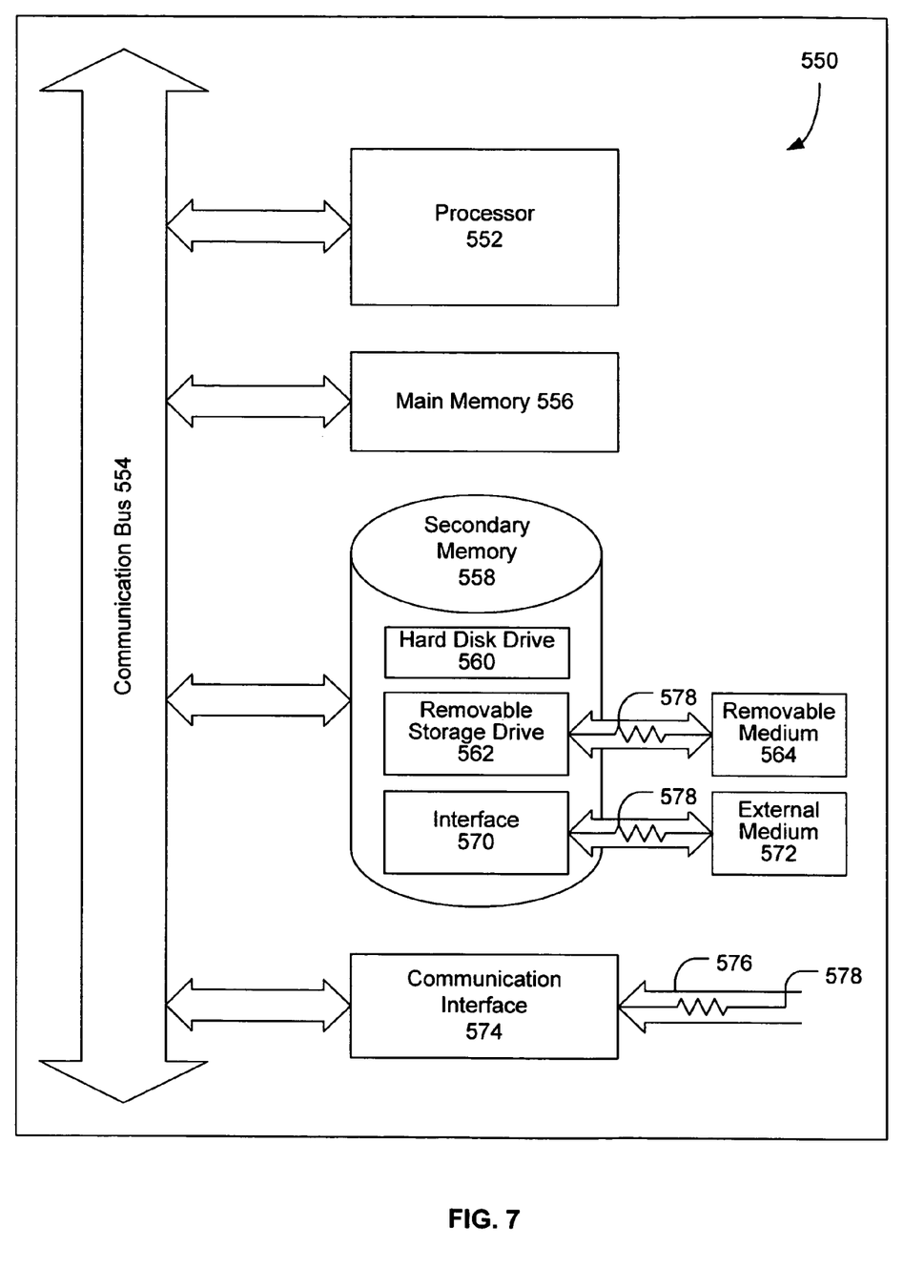
FIG. 7 is a block diagram illustrating an exemplary computer system as may be used in connection with various embodiments described herein.

FIG. 7 is a block diagram illustrating an exemplary computer system 550 that may be used in connection with the various embodiments described herein. For example, the computer system 550 may be used in conjunction with the server 60 as previously described with respect to FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete pi coprocessors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/ point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While the particular systems and methods herein shown and described in detail are fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A wireless communication device, comprising:
    a voice communication module configured to establish voice communication over a first wireless communication network via a first call;
    a data communication module configured to establish data communication over a second wireless communication network via a second call;
    a control module configured to manage simultaneous voice and data communications over the first wireless communication network and the second wireless communication network;
    a destination address module configured to obtain wireless data communication network address information for a remote wireless communication device in active voice communication over the first wireless communication network and send a predetermined data object to the wireless data communication network address over the second wireless communication network for said remote wireless communication device during the active voice communication.

2. The wireless communication device of claim 1, further comprising a camera configured to capture a digital image, wherein the predetermined data object is the digital image captured by the camera.

3. The wireless communication device of claim 1, wherein the destination address module is configured to parse a packet from the active voice communication to obtain the network address information.

4. The wireless communication device of claim 1, further comprising a data storage area having a phonebook comprising a plurality of phonebook entries, wherein the destination address module is configured to obtain the network address information from a phonebook entry stored in the data storage area.

5. The wireless communication device of claim 1, wherein the network address information is a phone number.

6. The wireless communication device of claim 1, wherein the network address information is an email address.

7. A method for sending a data object over a wireless communication network, comprising:
    establishing a first call over a first wireless communication network between a first handset and a second handset;
    identifying the data object;
    obtaining a network address for the second handset on a second wireless communication network;
    establishing a simultaneous second call between the first handset and the second handset over the second wireless communication network; and
    sending the identified data object from the first handset to the second handset via the second wireless communication network at the network address for the second handset on the second wireless communication network.

8. The method of claim 7, wherein the network address is a phone number.

9. The method of claim 7, wherein the network address is an email address.

10. The method of claim 7, wherein obtaining the network address comprises parsing a packet from the first call to obtain the network address for the second handset.

11. The method of claim 7, wherein obtaining the network address comprises querying a phone book data base on the first handset to retrieve the network address for the second handset.

12. The method of claim 7, wherein the establishing a first call step comprises establishing a voice call over the first wireless communication network between the first handset and the second handset;
    wherein the identifying step comprises capturing a digital image at the first handset; and
    wherein the sending step comprises sending the captured digital image from the first handset to the second handset at the network address for the second handset.

13. A computer readable medium having stored thereon one or more sequences of instructions for causing one or more microprocessors to perform the steps for sending a data object over a wireless communication network, the steps comprising:
    establishing a first call over a first wireless communication network between a first handset and a second handset;
    identifying the data object;
    obtaining a network address for the second handset on a second wireless communication network;
    establishing a simultaneous second call between the first handset and the second handset over the second wireless communication network; and
    sending the identified data object from the first handset to the second handset via the second wireless communication network at the network address for the second handset on the second wireless communication network.

14. The computer readable medium of claim 13, wherein the network address is a phone number.

15. The computer readable medium of claim 13, wherein the network address is an email address.

16. The computer readable medium of claim 13, wherein the step for obtaining a network address comprises parsing a packet from the first call to obtain the network address for the second handset.

17. The computer readable medium of claim 13, wherein the step for obtaining a network address comprises querying a phone book data base on the first handset to retrieve the network address for the second handset.

* * * * *